May 30, 1933.  J. M. COOTE  1,911,811
LOW LEVEL ATTACHMENT FOR STORAGE BATTERIES
Filed Oct. 23, 1928
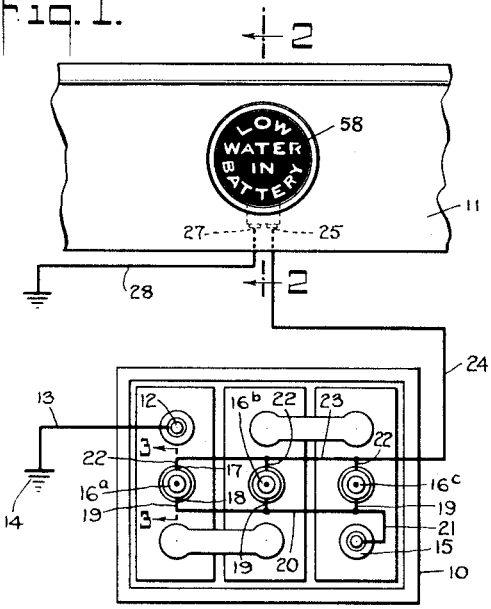
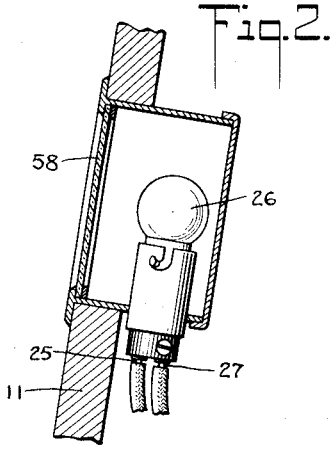
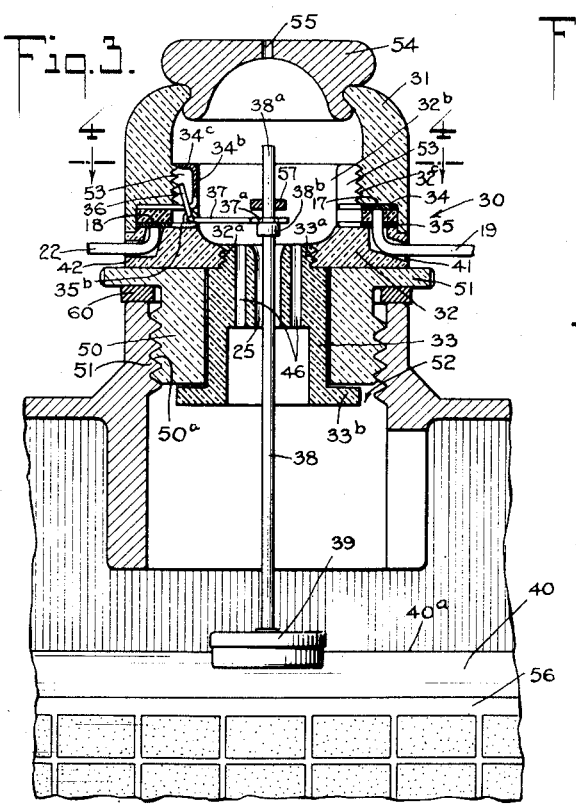
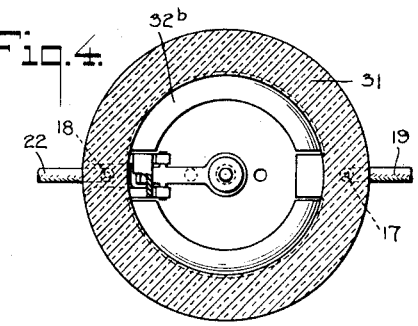
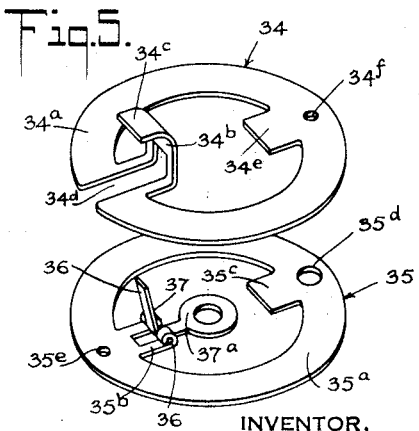
INVENTOR,
John M. Coote
BY
HIS ATTORNEY Patented May 30, 1933

1,911,811

UNITED STATES PATENT OFFICE

JOHN M. COOTE, OF ELIZABETH, NEW JERSEY

LOW LEVEL ATTACHMENT FOR STORAGE BATTERIES

Application filed October 23, 1928. Serial No. 314,458.

This invention relates to level indicators for storage batteries for automobiles, aeroplanes, motor boats, radio and the like.

My invention is particularly directed to means for indicating the liquid level of the electrolyte of storage batteries and the like, when minimum level is attained, to thereby warn the user to replenish the electrolyte with the necessary water. While my invention is illustrated in the form of an attachment for storage batteries it will be apparent that the invention is not limited thereto, and is applicable for original construction of storage batteries, and for electrical cells in general.

In the several forms of my invention illustrated in the drawing, the usual plug for each filling opening of the battery is replaced by an embodiment of my invention unitarily comprising a member of suitable electrically insulating material, formed to suitably carry the contacts in normal non-engaging position and to house and guide a float and appurtenant parts for effecting the engagement between said contacts when the liquid level attains a predetermined minimum or other height.

In preferred forms of such embodiments the housing is of insulating material, molded as multiple separable parts, the parts being grouped and the contacts located between two molded parts and the assembly locked by positioning movements.

In the most preferred forms of my invention, there is provided an annular member having screw thread or other releasable connection with complementary connection of the filling opening of the battery, such annular member being freely rotatable about the housing for the contacts, and the assembly of the housing as a whole by screw threading one molded part to the other.

In these various forms of my invention, the molded insulated body provides for an open space at the top wherein the contacts, preferably one fixed contact and one movable contact, are located. Access to such open space is had by the provision of a relatively large opening in the upper molded part and a head or dome of compressible material such as soft rubber, serving as a closure member.

The float is located within a suitable housing part provided by the lower molded member, such housing being preferably provided with guiding faces, and to the float is attached a vertically extending rod or the like, preferably passing through a longitudinal perforation serving as a guide and carrying a suitable weighed member, or otherwise arranged whereby, upon depression of the float arising upon the lowering of the level of the electrolyte, the movable contact, or contacts in any other suitable manner, are brought into engagement, thereby closing the circuit through the contacts and energizing an electric lamp or otherwise indicating to the user that the electrolyte requires replenishing with water or other suitable liquid.

In such forms of my invention, the molded parts are arranged to provide for the union of the same by screw threaded movement, the screw threads being preferably located respectively on the exterior of one part and the interior of the other part, thereby reducing the cost and method of molding to the simplest terms.

In the various forms of my invention, the replenishing water or other liquid is poured into the open space at the top to the molded body, upon removing the closure member, and the passage of the replenishing liquid is afforded without obstruction directly from such open space to the electrolyte.

It is convenient to employ a simple lamp for the common indicator of the liquid levels of the respective cells of a storage battery. However, any other form of visual, or of aural or other type of indication may be employed.

Further features and objects of the invention will be more fully understood from the following detail description and the accompanying drawing.

Fig. 1 is a diagrammatic view showing partly in top plan a regulation storage battery of an automobile equipped with one form of my invention, and partly in vertical elevation a lamp and an indicator bearing an appropriate legend, shown mounted on the instrument board of the automobile.

Fig. 2 is a detail sectional elevation on line 2—2 of Fig. 1; on an enlarged scale;

Fig. 3 is a sectional elevation on line 3—3 of Fig. 1, of one form of my invention, on a greatly enlarged scale;

Fig. 4 is a sectional elevation on line 4—4 of Fig. 3;

Fig. 5 is an exploded view showing in perspective the pair of coacting annular contacts combined in the embodiment illustrated in Fig. 3.

Referring to the drawing, I have illustrated a preferred manner of use of my invention in connection with a storage battery 10 of an automobile, namely, by means of a lamp mounted on the instrument board 11 of an automobile. The storage battery 10 may be of any regulation type or any approved type of battery. The negative terminal is indicated at 12, and the "ground" wire by 13, shown "grounded" at 14, usually to the metal chassis on the automobile. The positive terminal is indicated at 15. In the particular storage battery illustrated, three cells are shown, and in such instance a set of three contact members and associated float members are employed pursuant to my invention.

The respective contact members are indicated in Fig. 1 at 16a, 16b, 16c, each having two terminals 17, 18; the respective terminals of like polarity are connected in multiple with one another. Thus, the terminals 17 are connected by the individual leads 19 to the common conductor 20, the free end 21 of which is connected to the positive terminal 15 of the storage battery, conveniently by means of a clip connector. The other terminals 18 are connected by the individual leads 22 to the common conductor 23, which is integral with or otherwise connected by the conductor 24 to a terminal 25 of the indicating lamp 26. The other terminal 27 of the lamp 26 is connected to the chassis or "ground" as indicated at 28.

One form of my invention is illustrated in the drawing in detail in Figs. 3, 4 and 5. This illustrated form comprises a housing 30 formed of molded parts, the upper 31, the intermediate part 32 and the lower part 33 of suitable insulating material, constructed and arranged to receive and locate the two contacts. One contact 34, see Figs. 3 and 5, is relatively fixed and comprises the substantially annular body portion 34a and contact portion proper 34b, preferably integral with said body portion 34a, and vertically upturned, with a substantially horizontal reentrant portion 34c. The other contact 35 comprises a relatively fixed substantially annular body portion 35a, having a radially inwardly directed portion 35b, preferably of a general forked formation, the terminal portions of which are bent upon themselves to form eyes for pivotally receiving the pintle extensions 36 of the movable terminal portions 37, illustrated as extending upwardly, for co-action with the upturned contact portion 34b, as aforesaid. Such disposition of the contacts is preferably had by cutting away the first-named contact member 34 as indicated at 34d, to freely receive within the resulting space of such cut-away portion the upwardly turned contact 37.

The contact 37 also embraces a substantially radially inwardly extending portion 37a, which may be in the form of a ring, adapted to receive the upper end 38a of the stem 38 of the float 39. The rod 38 is provided with the enlargement or sleeve 38b for holding the radial portion 37, 37a of the movable contact 35.

The contact members 34, 35 are preferably of Monel metal, or other suitable electrically conducting material which is non-corrodible by dilute sulphuric acid or other chemical serving as the electrolyte 40 of the storage or other battery.

The float 39 and its stem are preferably of celluloid or like electrically non-conducting material, and non-corrodible by the electrolyte. The float member is hollow and may be formed of complementary celluloid cups, the abutting flanges of which are suitably cemented to one another.

The intermediate molded part 32 of the housing 30 comprises essentially the horizontally extending substantially annular body portion provided with the inwardly disposed screw threading 32a and further comprises the vertically inwardly extending portion 32b having the outer screw threading 32c, the last-named meshing with corresponding screw threading on the inner face of the upper housing part 31. The intermediate molded part 32 is provided with the spaced, usually diametrically located perforations 41, 42, for respectively receiving the leads 19, 22 for the two contacts 34, 35, as more fully set forth hereinafter.

The lowermost molded portion 33 is essentially of general cylindrical formation having at its reduced upper end 33a screw threading for meshing with the screw threading 32a of the intermediate molded part, the body portion being provided with the substantially central, vertically extending passage 25 for freely receiving and guiding the stem 38 of the float 39; the molded portion 33 is also provided with the laterally disposed passages 46 of desired number and location, the purposes of which are described more fully hereinafter.

The housing 30 is arranged to be removably positioned within the filling opening or other suitable opening in the top of a cell of the storage or other battery, and preferably without applying a turning or twisting force to the housing when the housing is positioned and removed.

To attain such preferred arrangement I provide the annular member 50 having screw-theading 50a on its exterior face for meshing with the screw-thread 51 of the filling or other opening 52. For bayonet point formations of the filling or other opening, corresponding formations are employed in lieu of the screw threading 50a.

Desirably with such arrangement of the annular member 50, the lower molded member 33 of the housing 30 is outwardly flanged at its lower end 33b, thus revolubly retaining the annular member 50 interiorly with the remainder of the assembled parts of the housing 30. The member 50 is provided with the annular flange 51, preferably roughened, serving as its manipulating portion, for manually rotating the member 50, without rotation of the housing 30 or its immediate parts.

It will be observed that the upturned portion 32b of the intermediate molded part 32 of the housing is vertically slotted at 53, 53, primarily to locate and laterally enclose the contact portions 34b, 34c and 35b, 36, and secondarily for locating and locking the radial extension 34e of the contact 34 and the extension 35c of the contact 35.

The cap 54 is provided for the housing 30, and has a vent opening 55. The cap 54 is preferably of relatively soft rubber, to permit removal and insertion by pressure.

The use and operation of the parts of my invention will be largely understood from the foregoing. As is illustrated in Fig. 3, the level 40a of the electrolyte 40 is shown above the level minimum, that is to say, a considerable distance above the top of the electrodes indicated generally at 56. In this status the buoyancy of the float proper 39 will sustain its weight as well as of the vertical rod 38, guided generally by the sides of the vertical passage 25 of the lower housing part 33. However, it is desirable to positively weight the float 39 and its vertical rod 38, as by means of the weight 57, conveniently positioned on the upper end 38a of the vertical rod 38.

Accordingly, upon the lowering of the level 40a of the electrolyte 40 to or below the predetermined level minimum, the movable contact 36–37 is turned in a clockwise direction, as viewed in Figs. 3 and 5, thus causing the upturned contact part 36 to engage the vertically upturned part 34b of the fixed contact 34, thereby closing the circuit between the conductors 17, 18, thereby energizing the electrical lamp to give the indication "of low water" in the particular cell.

Upon removal of the cap 54 and pouring of distilled water or equivalent into the upper hollow space of the housing 30, such refilling liquid passes through the lateral passages 46 of the housing and thence to the body of the electrolyte within the cell, causing the body of the electrolyte to rise. Upon refilling to sufficient extent, the float 39 and therewith its rod 38 and abutment 38b will be raised, causing the contact parts 37, 37a to rise and rotate the movable contact portion 36, in this instance in counter-clockwise direction, and thus break the electrical engagement between the contact part 36 and the contact part 34b, and interrupting the circuit through the lamp 26, at this particular cell.

In the event that more than one cell has reached "low water" status, the circuit through the lamp 26 will not be completely broken, until all the cells in such status are refilled to proper elevated levels.

In the drawing I have illustrated an electric lamp 26 and a transluscent plate 58, in this instance, bearing the painted or other suitably applied legend "low water in battery"; however, other suitable forms of indicator and indication may be employed.

From the above it will be apparent that my individual indicator for the respective cells of the storage or other battery is of the normal open-circuit type, and no electrical energy of the battery is expended until the indication of low level is given, and in the meantime the invention is prepared for immediate operation. Furthermore, no material subject to corrosion, salts formation, deterioration or other chemical or mechanical process, is brought into contact directly or indirectly with the electrolyte; the electrode material employed by me is disposed remote from the electrolyte; Monel or like material may be employed without adding any appreciable expense, since the construction of the contacts receives but a small total mass and low labor costs of manufacture.

The relative elevation of the upper parts of the housing locates the opening of the housing above the outer top surface of the battery case, thereby eliminating the fouling of the interior of the housing and of the cap thereof by accumulations of water, acid, dust, etc., upon the battery top. It will be observed that insulation of the conductor leads extends to a location wholly within the walls of the insulating housing. It will be observed that the annular body portion 35a of the lower contact 35 is provided with the perforation 35d or other cut away portion to permit the conductor 19 with its insulated covering to pass therethrough; the bared terminal 17 of the conductor 19 is soldered or otherwise electrically connected to the contact 34 within the opening 34f, or in any other suitable manner. In a similar manner the bared terminal 18 is soldered or otherwise suitably electrically connected in the opening 35e of the conductor 35.

A gasket 60 of rubber or other suitable material is preferably employed to seal the flange 51 against the upper face of the walls of the filling or other opening.

Whereas I have described my invention by reference to specific forms thereof, it will be understood that many changes and modifications may be made without departing from the spirit of the invention.

I claim:—

1. A combined liquid filler and electric switch housing constructed to be secured in the opening of a cell of a storage or other battery comprising a housing member having securing elements arranged to be inserted in the filling or other opening of a cell, a set of contacts carried by said housing member and normally electrically insulated from one another, one of said contacts being movable, said housing member being formed of multiple parts provided with registering passages for the flow of replenishing liquid therethrough, said contacts being disposed at the joints of said multiple parts, a float member responsive to the liquid level of the electrolyte, and means for connecting said float member to the movable contact for moving said movable contact into electrical engagement with one another said connecting means forming no part of the electrical circuit.

2. A combined liquid filler and electric switch housing constructed to be secured in the opening of a cell of a storage or other battery comprising a housing member having securing elements arranged to be inserted in the filling or other opening of a cell, a set of contacts carried by said housing member and normally electrically insulated from one another, one of said contacts being movable, said housing member being formed of multiple parts provided with registering passages for the flow of replenishing liquid therethrough, said contacts being disposed and locked at the joints of said multiple parts, a float member responsive to the liquid level of the electrolyte, and means for connecting said float member to the movable contact for moving said movable contact into electrical engagement with one another said connecting means forming no part of the electrical circuit.

3. A combined liquid filler and electric switch housing constructed to be secured in the opening of a cell of a storage or other battery comprising a housing member having securing elements arranged to be inserted in the filling or other opening of a cell said housing member being provided with a hollow portion for the reception of liquid for replenishing the electrolyte and passage leading downwardly therefrom for the flow therethrough of the replenishing liquid, a set of contacts carried by said housing member and normally electrically insulated from one another, one of said contacts being movable, one of said contacts having an annular body portion, an inwardly radially extending portion and a movable contact portion carried by said inwardly radially extending portion, a float member responsive to the liquid level of the electrolyte, and means for connecting said float member to the movable contact for moving said movable contact into electrical engagement with another contact said connecting means forming no part of the electrical circuit.

4. A combined liquid filler and electric switch housing constructed to be secured in the opening of a cell of a storage or other battery, comprising a housing member formed of multiple parts provided with registering passages for the flow of replenishing liquid therethrough, said multiple parts having a recess at their adjoining surfaces, a set of contacts, one of said contacts having an annular body portion disposed and locked within said recess, a float member responsive to the level of the electrolyte of the cell, and means for connecting said float member to the movable contact for controlling the engagement of said contacts with one another said connecting means forming no part of the electrical circuit.

In testimony whereof I have signed this specification this 15th day of Sept. 1928.

JOHN M. COOTE.